April 4, 1961  N. E. RISK ET AL  2,978,050
FRONT END SUSPENSION FOR TRACTORS
Filed Oct. 28, 1958
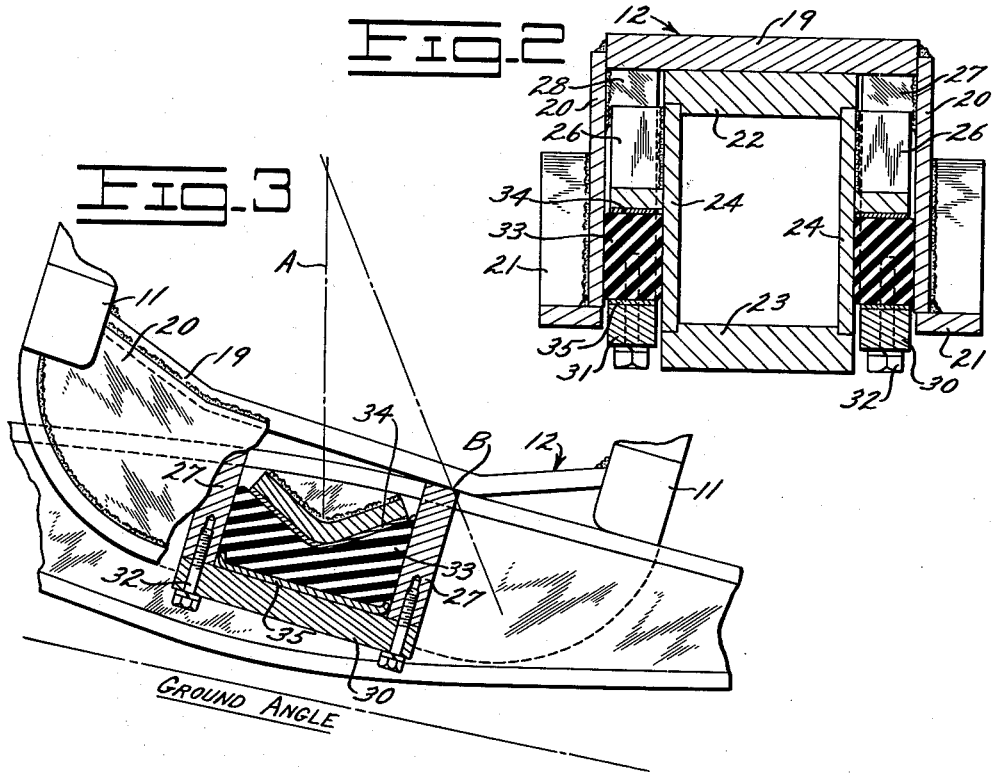
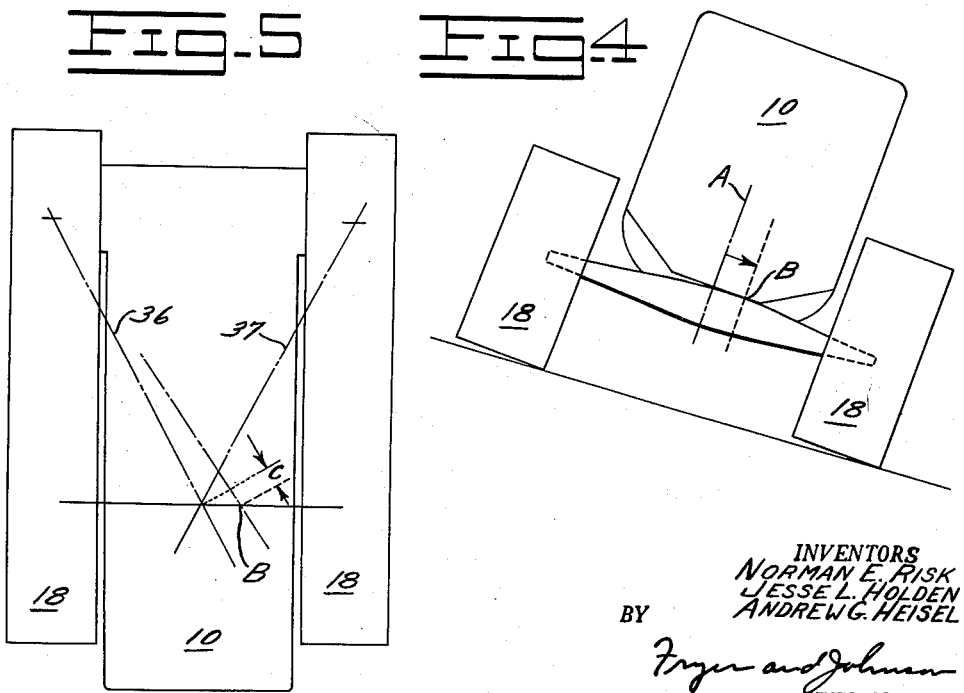
INVENTORS
NORMAN E. RISK
JESSE L. HOLDEN
ANDREW G. HEISEL
BY
ATTORNEYS United States Patent Office 2,978,050
Patented Apr. 4, 1961

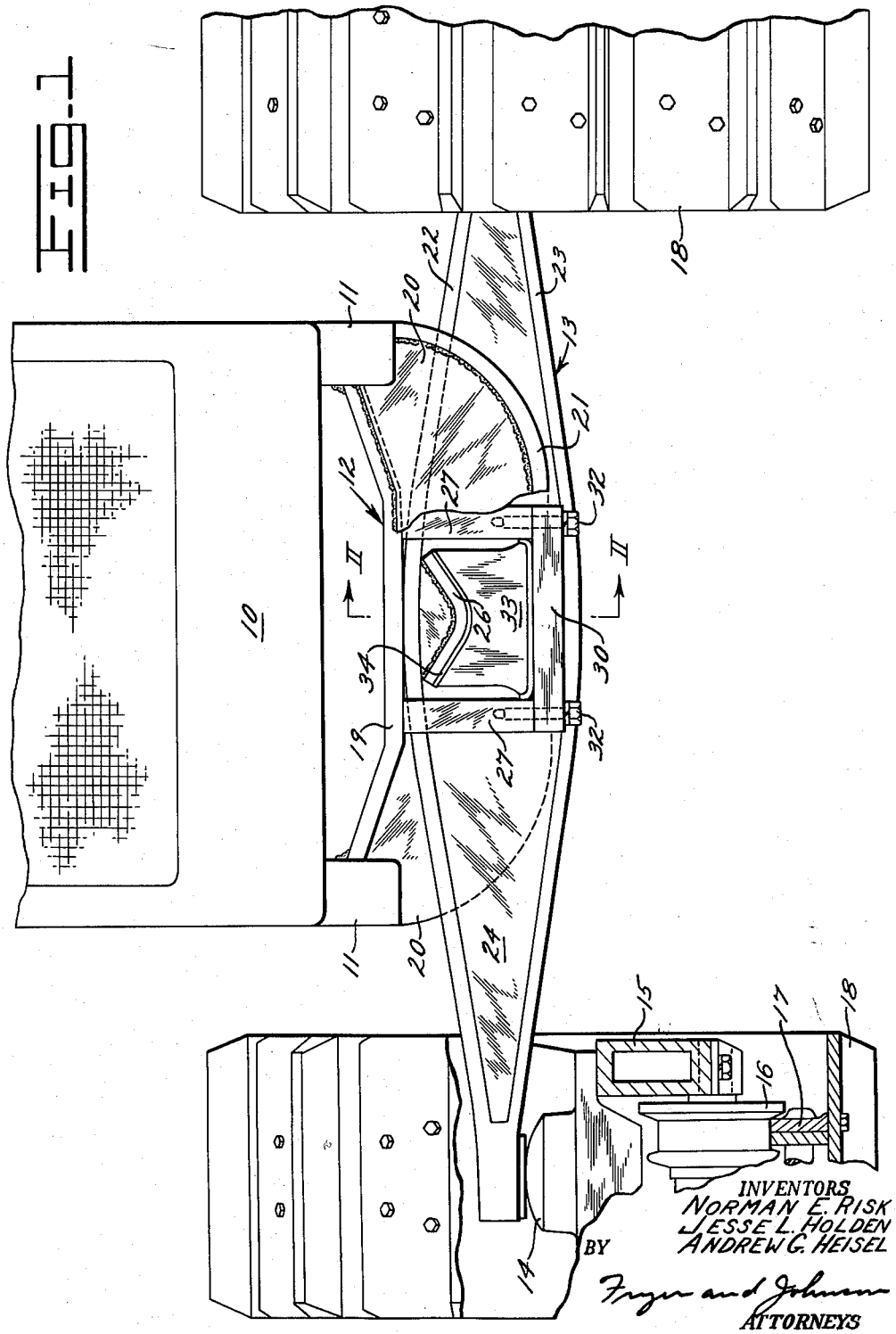

2,978,050
FRONT END SUSPENSION FOR TRACTORS

Norman E. Risk, Peoria, Jesse L. Holden, East Peoria, and Andrew G. Heisel, Pekin, Ill., assignors to Caterpillar Tractor Co., Peoria, Ill., a California corporation Filed Oct. 28, 1958, Ser. No. 770,184

4 Claims. (Cl. 180—9.5)

This invention relates to improvements in front end suspension for track-type tractors or the like and particularly to improvements in the construction and mounting of what is referred to as the tractor equalizer bar.

Many conventional track-type tractors comprise a main frame supporting a power unit and transmission mechanism and truck frames spaced on opposite sides of the main frame carrying endless tracks. The truck frames are connected adjacent their rear ends to the main frame through sprocket shafts which carry sprockets for driving the endless tracks. This connection is non-resilient but permits the truck frames to pivot about the axis of the sprocket shafts so that their forward ends can swing upwardly independently of each other as the tractor travels over obstacles or uneven terrain. Toward its forward end, the main frame is supported on a transverse member extending between the truck frames which, in the present instance, is a rigid member called an equalizer bar. This equalizer bar has a pivotal or rocking connection with respect to the main frame and rests upon suitable pads on the truck frames at its opposite ends so that upon raising or lowering of either of the track assemblies with respect to the other, it is free for rocking motion.

Some tractors include a pivotal connection in the form of a heavy pin between the equalizer bar and the track frame which is costly and usually positioned low for structural reasons and results in the center of gravity of the tractor being high with respect to the pivot. Other tractors have been constructed in the manner shown in the patent to Burks, 2,474,514 wherein the rigid equalizer bar rests directly against the underside of the transverse member between the tractor main frames and is held upwardly to prevent vertical separation between the equalizer bar and the tractor by means of an underlying spring and suitable links. This type of assembly has the disadvantage that the spring means depends below the equalizer bar and reduces the vertical clearance between the tracks.

It is the object of the present invention to overcome the disadvantages referred to above and to provide a front end suspension for tractors which through extremely simple construction gives high clearance with adequate resiliency, retains the tractor frame and equalizer bar against separation, provides a self-centering connection and gives better stability and balance to the tractor in rough terrain and side hill operation.

Further and more specific objects and advantages of the invention are made apparent in the following specification wherein reference is made to the accompanying drawings.

In the drawings:

Fig. 1 is a fragmentary view in front elevation of a tractor with its front end suspension constructed in accordance with the present invention and with parts broken away to disclose structural details;

Fig. 2 is a sectional view taken on the line II—II of Fig. 1;

Fig. 3 is a fragmentary view illustrating positions assumed by the parts of the structure shown in Fig. 1 when the tractor is operating on a side hill;

Fig. 4 is a schematic view in front elevation illustrating side hill operation; and Fig. 5 is a schematic view in plan of a tractor illustrating the effect on the balance of the tractor when it is operating in the manner illustrated in Figs. 3 and 4.

Referring first to Fig. 1 of the drawings, the front end of a tractor is illustrated at 10 as supported on a pair of main longitudinal frame members 11 connected adjacent their forward ends by a transverse frame member generally indicated at 12. An equalizer bar, generally indicated at 13, supports the transverse member 12 in a manner presently to be described and is in turn supported at its outer ends by pads 14 supported on the truck frames, one of which is indicated at 15, the support being such that the equalizer bar can slide laterally on pads 14 during rocking motion caused by raising or lowering of the truck frames 15. Conventional track rollers, one of which is shown at 16, roll on the usual endless track 17 which is articulated and connected with track shoes 18.

The transverse frame member 12 sometimes referred to as a saddle is of inverted U-shaped construction comprising, as illustrated in Fig. 2, a top plate 19 and downwardly extending front and back plates 20, the lower edges of which are reinforced as by flanges 21. The equalizer bar 13 which is disposed between the front and back plates of the transverse frame member 12 is of box-like construction having a top plate 22, a bottom plate 23 and front and back plates 24. The top plate 22 of the equalizer bar is curved upwardly at its central portion to provide a crown upon the center of which the forward end of the tractor is supported by contact with the underside of the top plate 19 of the transverse member 12, thus facilitating a rocking action when either track is raised or lowered with respect to the other. The plate 19 could, of course, be curved instead.

The means for connecting the equalizer bar with the transverse frame member of the tractor for holding these members against vertical separation as well as for entering them and providing resilient resistance to rocking motion of the equalizer bar is also best shown in Figs. 1 and 2. In these figures, a pair of V-shaped seats or plates 26 are illustrated as centrally disposed and welded to the front and back walls 24 of the equalizer bar. Two vertically disposed laterally spaced pairs of blocks 27 and 28 are welded to the inner surfaces of the front and back walls 20 respectively of the U-shaped transverse frame member 12. Horizontally disposed seats or bars 30 and 31 bridge the lower ends of the blocks 27 and 28, respectively, and are held in place as by cap screws illustrated at 32.

Disposed between the bars 30 and 31, which are carried by the transverse frame member 12, and the V-shaped plates 26, which are carried by the equalizer bar 13 are a pair of cushions of rubber or similar material 33 each having a wear plate 34 at its upper end corresponding in shape to the member 26 and a wear plate 35 at its lower end resting upon the bars 30 and 31, and the rubber of the cushion is preferably bonded to both plates. During assembly the rubber cushions are placed under compressive stress by tightening of the cap screws 32. Because of the V-shaped construction of the plates 26, the equalizer bar is held in its central position but is free to rock with respect to the frame of the tractor against the resistance of the rubber cushions which may expand laterally during such rocking motion to fill the spaces between themselves and the blocks 27 and 28 in the manner illustrated in Fig. 3.

In operation, when the tractor is on level ground, the bearing point at which its front end rests on the equalizer bar is coincident with the longitudinal center line of the machine which line is indicated at A in Figs. 3 and 4. At this time, the machine is balanced on two equal suspension axes illustrated at 36 and 37 in Fig. 5, these being lines drawn from the sprocket shafts (not shown) disposed rearwardly of the tractor through the forward central bearing point. When the tracks oscillate as in passing over uneven terrain or as in operation on a side hill, the bearing point moves laterally, as to the point B illustrated in Figs. 3 and 4 with the result that the suspension axis 36 on the high side of the tractor is increased a distance represented as C in Fig. 5 while the axis 37 on the low side of the tractor is correspondingly decreased. This increased axis and correspondingly increased moment arm creates a force, through unbalance, which tends to hold the high side of the tractor down rendering it more stable for hillside operation. This also facilitates steering during hillside operation when sterring sometimes becomes impossible because of the reduced weight on the uphill track.

We claim:

1. In front end suspension for track-type tractors of the kind which have a main frame and truck frames on opposite sides pivoted adjacent their rear ends with respect to the main frame, and which have a bar bridging the truck frames adjacent their forward ends, a cross member on the main frame resting centrally on said bar and free for rocking movement transversely of the tractor with respect to said bar, the improvement in resilient means for resisting such rocking movement which comprises a mass of rubber-like material adjacent said bar coincident with the longitudinal center line of the tractor, a seat carried by the cross member and supporting said mass, and a V-shaped reaction plate carried by the bar and compressively engaging said mass with its apex disposed centrally and downwardly.

2. The structure defined in claim 1 in which there is an identically supported mass of rubber-like material adjacent the front surface of the bar and the rear surface of the bar.

3. The structure defined in claim 1 including means to restrict lateral expansion of said mass upon rocking movement of the V-shaped reaction member against its upper surface.

4. The structure defined in claim 1 including threaded means to adjust the spacing between said seat and said reaction plate to facilitate assembly of the resilient mass therebetween under compression.

References Cited in the file of this patent

UNITED STATES PATENTS

| | | |
|---|---|---|
| 2,233,627 | McDonald | Mar. 4, 1941 |
| 2,238,002 | Pointer | Apr. 8, 1941 |
| 2,318,257 | Peterman | May 4, 1943 |
| 2,472,813 | Double et al. | June 14, 1949 |
| 2,474,514 | Burks | June 28, 1949 |

FOREIGN PATENTS

| | | |
|---|---|---|
| 612,396 | Great Britain | Nov. 11, 1948 |